(12) United States Patent
Tachibana et al.

(10) Patent No.: US 6,205,297 B1
(45) Date of Patent: *Mar. 20, 2001

(54) RECORDING APPARATUS WITH AUTOMATIC PAPER DISCHARGE AND FIXING ROLLER TEMPERATURE CONTROL FEATURES

(75) Inventors: Tatsuto Tachibana, Numazu; Kaoru Sato, Minami Ashigara, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/725,398

(22) Filed: Oct. 3, 1996

(30) Foreign Application Priority Data

Oct. 9, 1995 (JP) .................................... 7-287928

(51) Int. Cl.$^7$ ............................. G03G 15/00; G03G 15/20
(52) U.S. Cl. ............................................. 399/21; 399/322
(58) Field of Search ................................ 399/18, 20, 21, 399/33, 322

(56) References Cited

U.S. PATENT DOCUMENTS

| | | | |
|---|---|---|---|
| 4,090,787 | * 5/1978 | Hubbard et al. | 399/20 |
| 4,373,802 | * 2/1983 | Yuge et al. | 399/33 X |
| 4,585,333 | * 4/1986 | Yamagishi | 399/21 |
| 5,034,771 | * 7/1991 | Makita | 399/21 |
| 5,459,553 | * 10/1995 | Kim | 399/20 |
| 5,461,460 | * 10/1995 | Lee | 399/21 |
| 5,479,240 | * 12/1995 | Lee et al. | 399/21 |
| 5,489,968 | * 2/1996 | Rossbach et al. | 399/20 |
| 5,534,976 | * 7/1996 | Kim | 399/18 |
| 5,678,123 | * 10/1997 | Kim | 399/21 |

* cited by examiner

Primary Examiner—Fred L Braun
(74) Attorney, Agent, or Firm—Fitzpatrick, Cella, Harper & Scinto

(57) ABSTRACT

A recording apparatus often has a timing to shift to a standby status if there is no residual paper in the apparatus, for example, when a power source is turned on, when the apparatus is recovered from a sleep mode, when a door is closed, when the power source is reset, or the like. When the residual paper is detected in the apparatus at such a timing, the apparatus is controlled to a proper wait status in order to discharge the residual paper and waits for an instruction from the outside. In response to the paper discharging instruction from the outside, a discharging operation of the residual paper is executed.

30 Claims, 7 Drawing Sheets

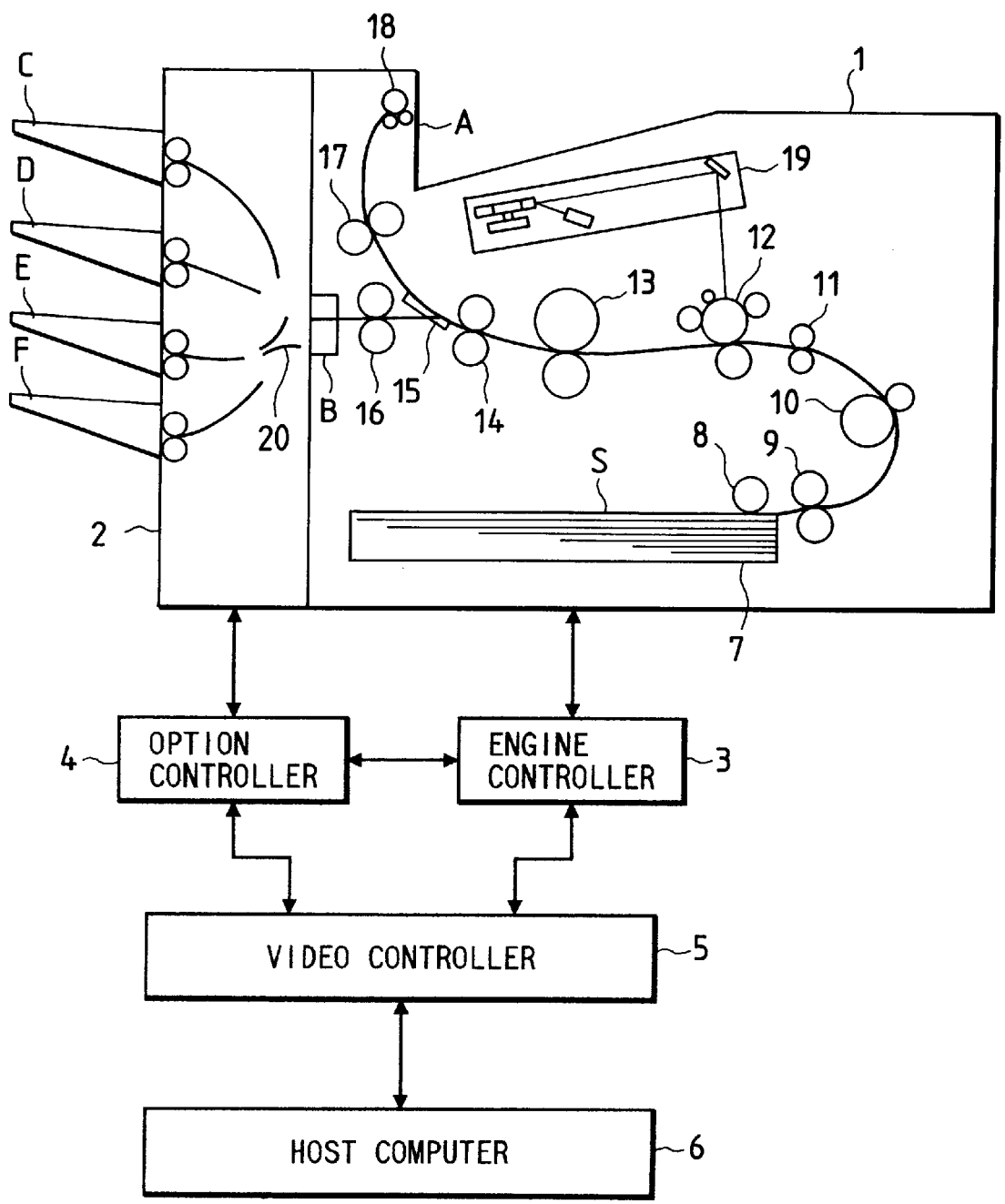

RECORDING APPARATUS WITH AUTOMATIC PAPER DISCHARGE AND FIXING ROLLER TEMPERATURE CONTROL FEATURES

BACKGROUND OF THE INVENTION

1. Field of the Invention

The invention relates to a recording apparatus for sequentially feeding cut sheets into the apparatus and printing.

2. Related Background Art

Hitherto, in a recording apparatus for sequentially feeding cut sheets into the apparatus and printing, when a residual paper is confirmed in the apparatus before activating the apparatus into a print wait status, a process is immediately performed by regarding a jam (paper jam) or the in-apparatus residual paper is soon automatically discharged to the outside of the apparatus irrespective of an instruction from the outside.

The inventors of the present invention have proposed a recording apparatus having an emergency stop function for forcedly stopping the driving of the recording apparatus from the outside. In such an apparatus, there is considered a method whereby when an instruction for an emergency stop is received during the paper transporting operation, a process is immediately performed by regarding a jam.

In the recording apparatus without the automatic paper discharging function as mentioned above, therefore, before the apparatus is activated to the print wait status or when the paper remains at the time of the emergency stop, the user has to eliminate the residual paper from the inside of the apparatus of a complicated construction by himself.

When the automatic paper discharging operation is performed before the recording apparatus enters the print wait status, if optional apparatuses such as paper feeding apparatus, paper discharging apparatus, and the like are connected around the recording apparatus, a matching of the operation with the peripheral apparatuses cannot be obtained and a paper jam occurs or, in the worst case, a damage of the apparatus can also occur.

SUMMARY OF THE INVENTION

It is an object of the invention to solve the above problems and to provide a recording apparatus which can smoothly perform a paper discharging operation when a paper remains in the recording apparatus.

In the specification, the operation to discharge the residual paper on the basis of an instruction from the outside is called an automatic paper discharge.

To accomplish the above object, according to the invention, there is provided a recording apparatus comprising: in-apparatus residual paper checking means for checking the presence or absence of an in-apparatus residual paper before shifting to a print wait status; automatic paper discharging means for keeping the apparatus in a paper discharge wait status and allowing the apparatus to wait until an instruction is issued from the outside when there is an in-apparatus residual paper and, when the instruction from the outside is received, for driving a paper transporting system and ejecting the in-apparatus residual paper to the outside of the apparatus; and external interface processing means for notifying the outside of paper residual information and accepting the paper discharging instruction from the outside, wherein when the instruction is issued from an external apparatus, the automatic paper discharge can be immediately executed and the external apparatus can execute the paper discharge in accordance with an ambient status.

External interface processing means for ignoring the paper discharging instruction from the outside until a printing apparatus enters a predetermined automatic paper discharge wait status is provided for the recording apparatus, thereby making it possible to prevent the automatic paper discharge being executed in a state in which the recording apparatus itself is in a status in which an automatic paper discharge is not possible.

Further, the external interface processing means for informing the outside of a fact that the automatic paper discharge can be performed at a time point when the printing apparatus enters the predetermined automatic paper discharge wait status is provided for the recording apparatus, thereby enabling an external control apparatus (or operator) to confirm that the recording apparatus has entered the automatic paper discharge possible status.

An automatic paper discharge wait time of the recording apparatus is limited and when no paper discharge instruction is generated within a predetermined time, it is decided that a jam has occurred, thereby making it possible to prevent the occurrence of an inconvenience such that the recording apparatus enters a dangerous state or an inconvenience which is caused by performing the automatic paper discharge in a status in which the automatic paper discharge is not possible.

Particularly, by setting a limitation (time when the occurrence of a jam is judged) of the automatic paper discharging wait to a time such that since the paper continuously remains on a transporting path, the paper is consequently curled and cannot be transported, a paper jam or damage to the apparatus which occurs by trying to discharge the paper that cannot be transported can be prevented.

Particularly, with respect to a recording apparatus for thermally fixing, as a condition for the automatic paper discharge wait status, by setting an automatic paper discharge wait temperature of a fixing device to a lowest temperature at which a developing agent is not deposited to the fixing device, a phenomenon such that the unfixed developing agent is deposited to the fixing device by the automatic paper discharge is prevented. By setting the automatic paper discharge wait temperature of the fixing device to the highest temperature at which the generation of a fire or smoke from the paper does not occur or a burned trace is not formed on the paper when the paper remains in the fixing device, it is possible to prevent the apparatus from entering a dangerous state in the automatic paper discharge wait status.

Further, with respect to the recording apparatus for performing a thermal fixing process, by setting a limitation (time at which the occurrence of a jam is judged) in the automatic paper discharge wait status to a time such that the generation of a fire or smoke from the paper does not occur or a burned trace is not formed on the paper at the automatic paper discharge wait temperature set in the case where the paper remains in the fixing device, it is possible to prevent the apparatus from entering a dangerous state in the automatic paper discharge wait status.

To accomplish the above object, according to the invention, there is provided a recording apparatus comprising: emergency stop means for stopping a driving system in response to an instruction from the outside; in-apparatus residual checking means for checking the presence or absence of an in-apparatus residual paper after completion of the execution of an emergency stop; automatic paper discharging means for stopping a paper transporting system and waiting until an instruction is generated from the outside when there is a presence of the in-apparatus residual paper and for driving the paper transporting system and ejecting the in-apparatus residual paper to the outside of the apparatus when the instruction from the outside is received; and external interface processing means for notifying the outside of paper residual information and for accepting a paper discharging instruction or an emergency stop instruction from the outside, wherein even when the instruction for the emergency stop is received during the paper transportation, the in-apparatus residual paper is not processed while regarding the occurrence of a jam but can be set to a target of the automatic paper discharge.

BRIEF DESCRIPTION OF THE DRAWINGS

FIG. 7 is a block diagram showing a functional construction of the embodiment 3.

DETAILED DESCRIPTION OF THE PREFERRED EMBODIMENTS

Embodiments of the invention will now be described with reference to the drawings.

Embodiment 1

Figure 1:
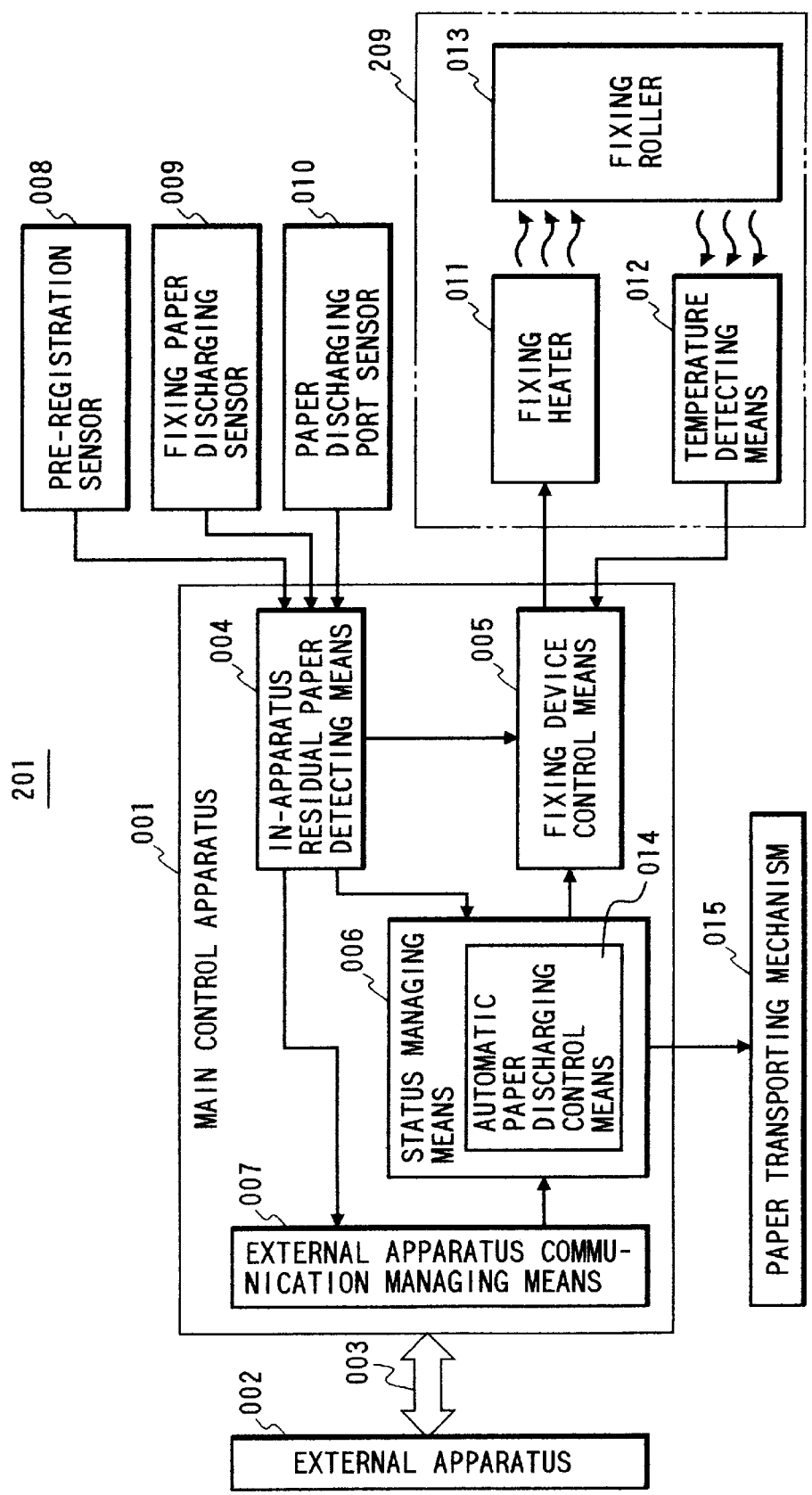
FIG. 1 is a block diagram showing a functional construction of the embodiment 1 of the invention.
Figure 2:
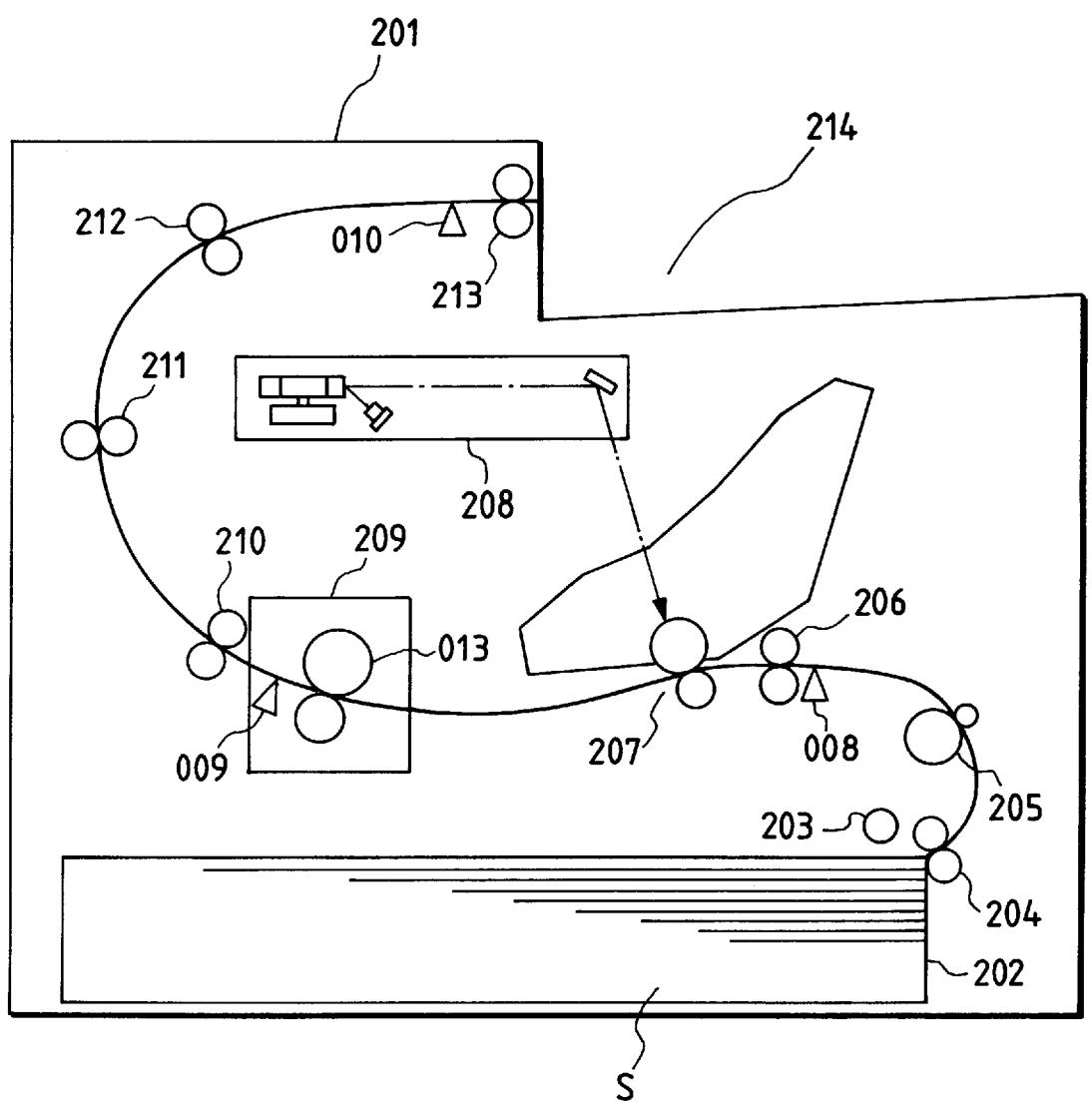
FIG. 2 is a vertical sectional view of a laser beam printer in the embodiment 1 of the invention.

FIG. 2 is a vertical sectional view of a laser beam printer 201 having automatic paper discharge control means according to the invention. As shown in FIG. 2, the laser beam printer 201 has a cassette 202 to enclose recording papers S and also has a pickup roller 203 to pick up the recording papers one by one from the cassette 202 and a paper feed roller 204 to feed the picked up recording paper. A transporting roller 205 to transport the recording paper, which was fed to a registration roller, and which will be explained hereinlater, is arranged downstream of the paper feed roller 204. A registration roller 206 to synchronously transport the recording paper S is arranged downstream of the transporting roller 205. A pre-registration sensor 008 is arranged just before the registration roller. An image forming unit 207 for forming an image by a laser beam from a laser scanner unit 208 is arranged downstream of the registration roller 206. Further, a fixing device 209 constructed by a fixing roller 013, a fixing heater 011, which will be explained hereinlater, temperature detecting means 012 (refer to FIG. 1), and the like is arranged downstream of the image forming unit 207. A fixing paper discharging sensor 009 and paper discharge transporting rollers 210, 211, 212, and 213 are arranged downstream of the fixing roller 013, thereby transporting the recording paper to a paper discharging tray 214. A paper discharging port sensor 010 is arranged between the paper discharge transporting rollers 212 and 213.

FIG. 1 is a block diagram showing an electrical construction of the laser beam printer 201. The laser beam printer 201 has a main control apparatus 001 to control the whole printer. The main control apparatus 001 is constructed using a CPU, a ROM, a RAM, a gate element, and the like and a main section of the control is realized by a software written in the ROM.

The main control apparatus 001 is connected to an external apparatus 002 through an external interface 003. Functions of the main control apparatus 001 are constructed using an in-apparatus residual paper detecting means 004, a fixing device control means 005, a status managing means 006, and an external apparatus communication control means 007. The status managing means 006 has therein automatic paper discharging control means 014. A paper transporting mechanism 015 to drive each of the paper transporting rollers, a pre-registration sensor 008, a fixing paper discharging sensor 009, a paper discharging port sensor 010, a fixing heater 011, a temperature detecting means 012, and the like are connected to the main control apparatus 001. The main control apparatus controls the print operation by using those peripheral apparatuses. Since a print control of the laser beam printer is well-known, its detailed description is omitted.

The processing operation of each unit of the main control apparatus 001 will now be described. The in-apparatus residual paper detecting means 004 discriminates whether the paper is present in the apparatus or not on the basis of signals from the pre-registration sensor 008, fixing paper discharging sensor 009, and paper discharging port sensor 010.

The fixing device control means 005 turns on or off the fixing heater 011 on the basis of information of the temperature detecting means 012 in a manner such that a temperature of the fixing roller 013 is equal to a control target temperature that is set by the status managing means 006, which will be explained hereinlater, and informs the status managing means 006 of a temperature value of the fixing roller.

Figure 3:
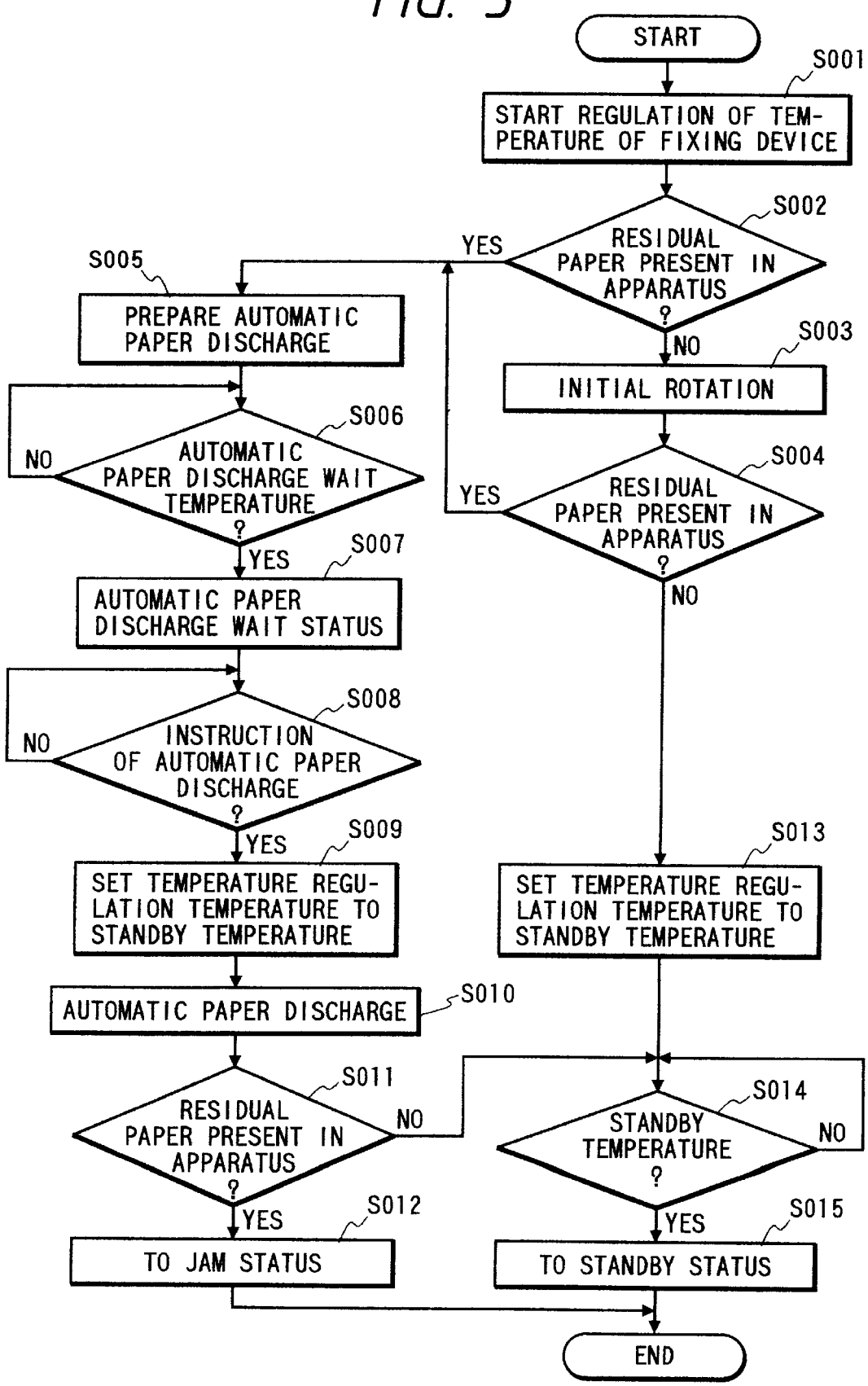
FIG. 3 is a flowchart showing a control of status managing means in the embodiment 1 of the invention.

The status managing means 006 manages a control status of the laser beam printer 201 such as warming-up, standby (print wait), print, jam, or the like in accordance with a given situation. Particularly, the processes of warming-up and standby regarding the automatic paper discharging process of the invention will be described. FIG. 3 is a flowchart for the warming-up process of the status managing means 006.

When a door is closed after the end of a printer initialization after the power source of the laser beam printer was turned on or reset, or as a process for returning to the standby status from a status in which the driving of each unit of the laser beam printer was stopped as in the case of a jam or a sleep mode, the warming-up process is started. When the warming-up process is started, first in step S001, a temperature regulation of the fixing device is started. After that, in step S002, the presence or absence of the in-apparatus residual paper is discriminated on the basis of information from the in-apparatus residual paper detecting means in step 004. When there is the present of in-apparatus residual paper, the processing routine advances to the automatic paper discharging process in step S005 and subsequent steps. When no in-apparatus residual paper is detected, step S003 follows and an initial rotation is executed. Each of the driving system is driven for a short time and the operation of each unit is checked. During the initial rotation as well, the in-apparatus residual paper detecting means 004 monitors the presence or absence of the in-apparatus residual paper. The above process is a process in consideration of a situation such that no residual paper exists in front of the above three paper sensors at a time point in step S001.

After that, whether the in-apparatus residual paper has been detected during the initial rotation or not is judged in step S004. When the in-apparatus residual paper is detected here, the processing routine advances to the automatic paper discharging process in step S005 and subsequent steps. When the in-apparatus residual paper is not detected, the control target temperature is set to a standby temperature in step S013 and, after that, the processing routine advances to S014 and subsequent steps.

In the automatic paper discharging process after step S005, first, as a preparation to the automatic paper discharging wait status, the control target temperature of the fixing device 209 is set to an automatic paper discharging wait temperature in step S006. When the unfixed paper is transported to the fixing device 209, the automatic paper discharge wait temperature has been preset as a lowest limit temperature at which no toner is deposited to the fixing roller 013. Information indicating that the automatic paper discharge is under preparation is notified to the external apparatus communication control means 007. The external apparatus communication control means 007 transfers the information indicative of the presence of the in-apparatus residual paper to the external apparatus on the basis of the above information and also cancels an automatic paper discharging instruction from the external apparatus until the apparatus enters the automatic paper discharge wait status. After that, the apparatus waits until the temperature of the fixing roller is set to the automatic paper discharge wait temperature in step S006. When the temperature of the fixing roller reaches the automatic paper discharge wait temperature, a fact that the apparatus has entered the automatic paper discharge wait status is informed to the external apparatus communication control means 007 in step S007. On the basis of such information, the external apparatus communication control means 007 notifies the external apparatus of a fact that the automatic paper discharge can be performed.

After that, the apparatus waits for the automatic paper discharging instruction from the external apparatus in step S008. When the automatic paper discharging instruction is generated from the external apparatus, the control target temperature is set to the standby temperature in step S009. After that, the processing routine advances to step S010 and drives the paper transporting mechanism 015, thereby automatically discharging the paper. After the automatic paper discharging operation was performed for a predetermined time, step S011 follows and the presence or absence of the in-apparatus residual paper is judged. When the in-apparatus residual paper exists here, each driving system (including the fixing heater) is stopped and the apparatus is shifted to the jam status in step S012. When there is no in-apparatus residual paper, the processing routine advances to step S014 and subsequent steps. The apparatus waits until the temperature of the fixing roller reaches the standby temperature in step S014. When it reaches the standby temperature, the processing routine advances to the standby status in step S015. The setting to the standby temperature in step S009 can also be performed after completion of the automatic paper discharge.

By controlling as mentioned above, the automatic paper discharging process can be performed without exerting an adverse influence on the fixing roller. Even when the input/output apparatuses are connected as peripheral apparatuses, since the external apparatus for managing the whole system can manage the automatic paper discharge, the automatic paper discharge according to a situation of the whole system can be performed.

In the above embodiment, the temperature at which the fixing roller is not stained by the unfixed toner has been set as an automatic paper discharge wait temperature. However, even when the in-apparatus residual paper is sandwiched by the fixing roller, by setting the automatic paper discharge wait temperature to a temperature at which the generation of a fire or smoke does not occur, the system can be safely controlled. In this case, the control target temperature which is set in step S005 in the control flow (FIG. 3) of the status managing means 006 is set to a temperature at which the generation of a fire or smoke from the paper does not occur even when the paper is sandwiched by the fixing roller. By controlling the system as mentioned above, safety when the wait status of the automatic paper discharging instruction continues for a long time can be raised.

To further raise safety, by setting the automatic paper discharge wait temperature to a temperature at which no burned trace is formed on the paper even when the in-apparatus residual paper is sandwiched by the fixing roller, a safe control can be performed. In such a case, the control target temperature which is set in step S005 of the control flow (FIG. 3) of the status managing means 006 is set to a temperature at which no burned trace is formed on the paper even if the paper is sandwiched by the fixing roller. By controlling the system as mentioned above, safety when the wait time of the automatic paper discharging instruction is long can be further raised.

Embodiment 2

In the above embodiment, the automatic paper discharge wait temperature has been set to the temperature at which even when the paper is sandwiched by the fixing roller, no burned trace is formed on the paper or the generation of a fire or smoke from the paper does not occur. However, even at such a relatively low temperature, when the paper is sandwiched by the fixing roller for a very long time, it becomes a cause of a jam at the time of the paper discharge, so that it is not preferable.

When the paper is transported by the automatic paper discharging instruction, there is a possibility that the unfixed toner is deposited onto the fixing roller. From this point of view, it is preferable to set the automatic paper discharge wait temperature to a temperature which is lower than the fixing temperature by 10 to 40° C. For example, now assuming that the fixing temperature of the normal paper is equal to 190° C., a temperature of about 150° C. to 180° C. is desirable. However, when the instruction waiting state continues from the outside for a long time in a state in which the paper is sandwiched by the fixing roller, a fear of generation of a fire or smoke from the paper in dependence on an environment where the apparatus is installed.

Figure 4:
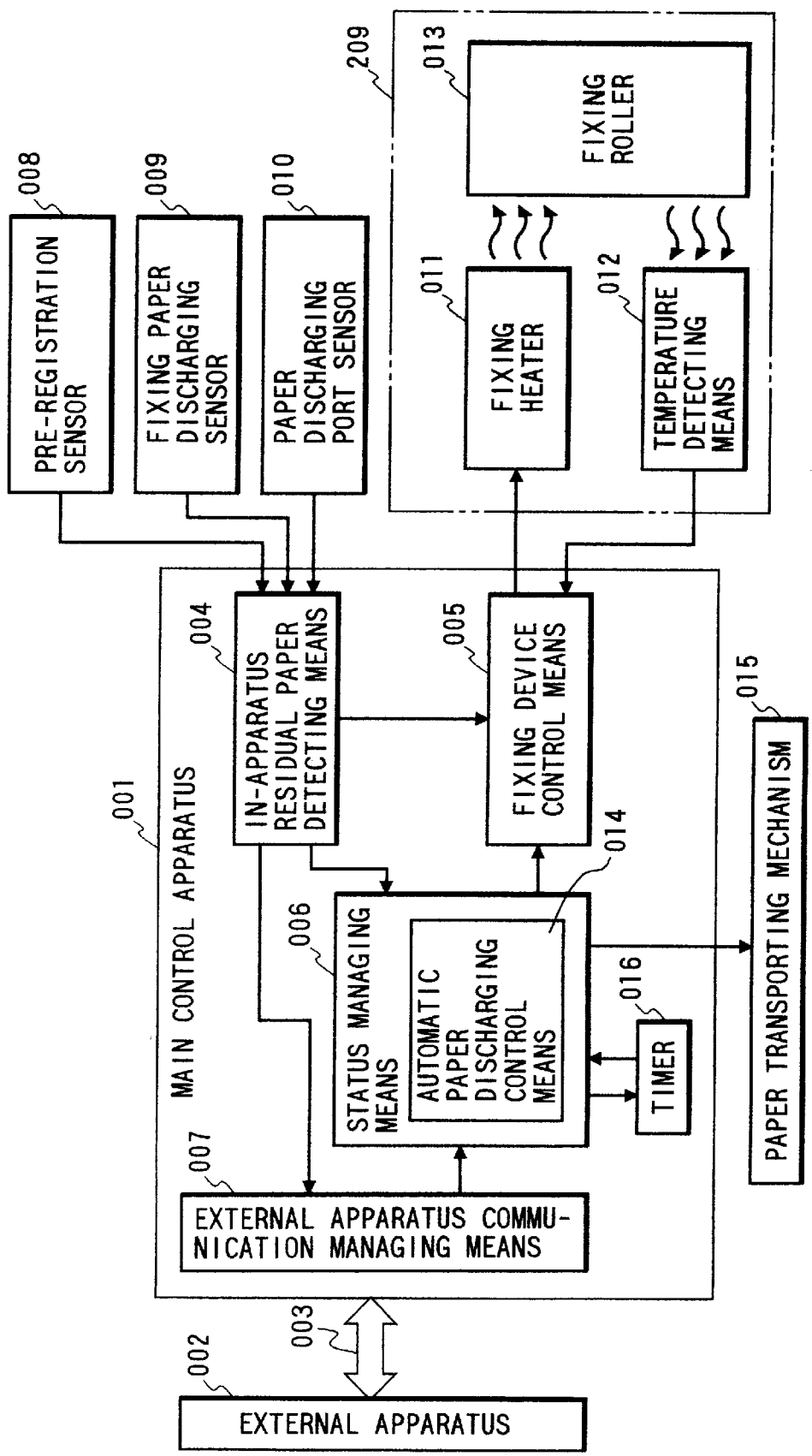
FIG. 4 is a block diagram showing a functional construction of the embodiment 2 of the invention.

In the second embodiment, therefore, a wait time for the automatic paper discharging instruction is limited. FIG. 4 is a block diagram showing a functional construction of the second embodiment. Although the construction is almost similar to that of the first embodiment shown in FIG. 1, a timer 016 for managing the automatic paper discharge wait time is newly added. Other portions except the status managing means 006 (particularly, automatic paper discharge control means 014) are controlled in a manner similar to the first embodiment.

Figure 5:
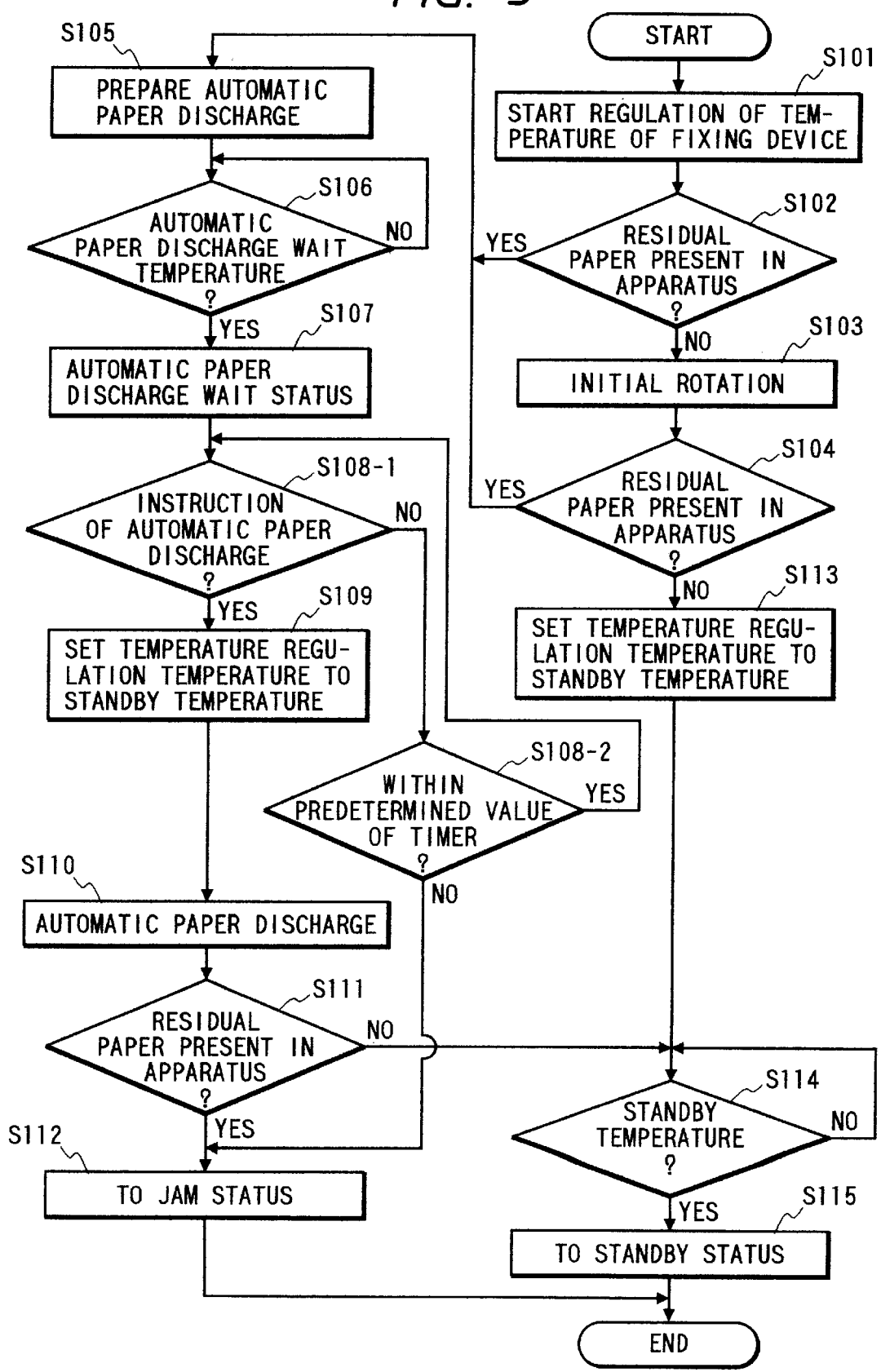
FIG. 5 is a flowchart showing a control of status managing means in the embodiment 2 of the invention.

FIG. 5 is a flowchart for a control of the warming-up process of the status managing means 006 in the embodiment. Processing steps S101 to S104 and S113 to S115 are similar to the processing steps S001 to S004 and S013 to S015 in FIG. 3 of the first embodiment. The automatic paper discharging control in steps S005 to S011 is different from that of the first embodiment with respect to the following points. The automatic paper discharge wait temperature which is set as a control target temperature in step S105 is set to the lowest limit temperature at which no toner is deposited to the fixing roller 013 when the same unfixed paper as that in the embodiment 1 is transported to the fixing device 209. However, it can be also set to a temperature lower than the lowest limit temperature. In the second embodiment, when the apparatus enters the automatic paper discharge wait status in step S107, a counting operation of the timer 016 is started. After that, a count value of the timer 016 is checked in step S108-2 for a period of time during which the apparatus waits for the automatic paper discharging instruction in step S108-1. When the count value exceeds a predetermined value, the occurrence of a jam is recognized and all of the driving systems (including the fixing heater) are stopped. The processing routine advances to a jam status in step S112. When the automatic paper discharging instruction is received within a predetermined time in step S108-1, the processing routine advances to step S109 and subsequent steps. The processes after that are similar to those in the first embodiment.

By controlling the system as mentioned above, even if the apparatus receives the automatic paper discharging instruction in the wait status of the automatic paper discharging instruction and immediately starts the automatic paper discharging operation, the fixing roller is not polluted and a danger which is caused when the paper is sandwiched by the fixing roller for a long time can be avoided.

Embodiment 3

FIG. 7 is a schematic vertical sectional view of a laser beam printer according to a third embodiment of the invention. For convenience of explanation, the third embodiment will be described with respect to an example of the laser beam printer of the construction as shown in FIG. 7 as a printing apparatus main body. The invention, however, is not limited to such an example.

In FIG. 7, a laser beam printer 1 has a cassette 7 to enclose recording papers and also has: a pickup roller 8 to pick up the recording papers one by one from the cassette 7; and a paper feed roller 9 to feed the recording paper which was picked up. A transporting roller 10 is arranged downstream of the paper feed roller 9. A pair of registration rollers 11 for synchronously transporting the recording paper S is arranged downstream of the transporting roller 10. An image forming unit 12 to form an image by a laser beam from a laser scanner unit 19 is arranged downstream of the pair of registration rollers 11. Further, a fixing device 13 is arranged downstream of the image forming unit 12. A fixing paper discharging roller 14 is arranged downstream of the fixing device 13.

An FU flapper 15 is arranged downstream of the fixing paper discharging roller 14. The FU flapper 15 distributes the printed paper (recording paper) to either one of two destinations of an FU (face-up) paper discharging port or an FD (face-down) paper discharging port. A pair of FU paper discharge transporting rollers 16 are arranged downstream on the FU side of the FU flapper and transports the paper to an FU paper discharging port B. On the other hand, a pair of FD paper discharge transporting rollers 17 and an FD paper discharging port roller 18 are arranged downstream on the FD side of the FU flapper, thereby transporting the paper to an FD paper discharging port A.

For example, an external apparatus as an optional paper discharging apparatus 2 is connected to the laser beam printer 1. The optional paper discharging apparatus 2 receives the paper which is discharged from the FU paper discharging port B of the laser beam printer 1 and discharges the printed paper S to any one of four paper discharging trays C, D, E, and F by a flapper 20.

The laser beam printer 1 and optional paper discharging apparatus 2 have an engine controller 3 and an optional controller 4 for controlling each unit in the apparatus, respectively. A video controller 5 as an external control apparatus for managing and controlling the engine controller 3 and option controller 4 as one whole printing apparatus is connected thereto. Further, a host computer 6 is connected to the video controller 5. A simple signal such as a timing signal or the like can be directly transmitted and received between the engine controller 3 and optional controller 4.

When data to print is sent from the host computer 6, the video controller 5 develops the print data into a bit map and drives the laser beam printer 1 and optional paper discharging apparatus 2 through the engine controller 3 and optional controller 4, thereby printing. After that, the printed paper is ejected to a predetermined paper discharging port.

For example, when the printed paper is ejected to the paper discharging tray D of the optional paper discharging apparatus 2, the video controller 5 designates the paper discharge to the FU paper discharging port B for the engine controller 3 and generates a printing instruction. The video controller 5 also instructs the optional paper discharging apparatus 2 to eject the paper to the paper discharging tray D.

In this instance, the engine controller 3 controls each of the above option units of the laser beam printer 1, transports the paper, prints in accordance with a video signal which is sent from the video controller 5 in accordance with a well-known electrophotographic process, and transports the printed paper to the FU paper discharging port. Further, the engine controller 3 outputs a paper discharge previous notice signal to the optional controller 4 at a predetermined timing before the printed paper reaches the FU paper discharging port.

On the other hand, when receiving the paper discharging instruction from the video controller 5, the optional controller 4 waits until the paper discharge previous notice signal is generated from the engine controller 3. When the paper discharge previous notice signal is issued, the video controller 4 drives the flapper 20 and sets a destination of the paper to the paper discharging tray D, thereby transporting the paper to the tray D.

In the operation as mentioned above, for example, when a jam occurs in the optional paper discharging apparatus 2, the optional controller 4 immediately stops the driving system of the optional paper discharging apparatus 2 and sends information indicative of the occurrence of the jam to the video controller 5. In this instance, if the paper which is being transported to the FU paper discharging port B exists in the laser beam printer 1, the optional paper discharging apparatus 2 is in a status in which it cannot receive the paper any more, so that the transportation of the paper has to be immediately stopped. Although the video controller 5 also needs to instruct the laser beam printer 1 to stop the driving, since the conventional laser beam printer does not have a function which can instruct the engine controller 3 to perform an emergency stop from the external apparatus, the printer cannot cope with such a situation. The laser beam printer 1 of the present invention, accordingly, is constructed in a manner such that the printer has a command to send an instruction for an emergency stop from the video controller 5 to the engine controller 3 and, when such a command is received, the driving system of the laser beam printer 1 is immediately stopped.

In the embodiment, in the printing apparatus having the emergency stop function to forcedly stop the driving from the external apparatus during the printing, even if an emergency stop instruction is received during the print operation, the occurrence of jam is not decided but the system is set into the wait status of the automatic paper discharging instruction.

In the third embodiment, portions except the process in the status managing means 006 in the construction of FIG. 4 of the second embodiment are controlled in a manner similar to the second embodiment. Different points will now be described.

Although the status managing means 006 of the embodiment third executes substantially the same process as that in the flowchart shown in FIG. 5 of the second embodiment with respect to the warming-up process, a different process is executed in the printing status. The video controller 5 in FIG. 7 corresponds to the external apparatus 002 in FIG. 4 and the engine controller 3 corresponds to the main control apparatus 001 in FIG. 4.

Figure 6:
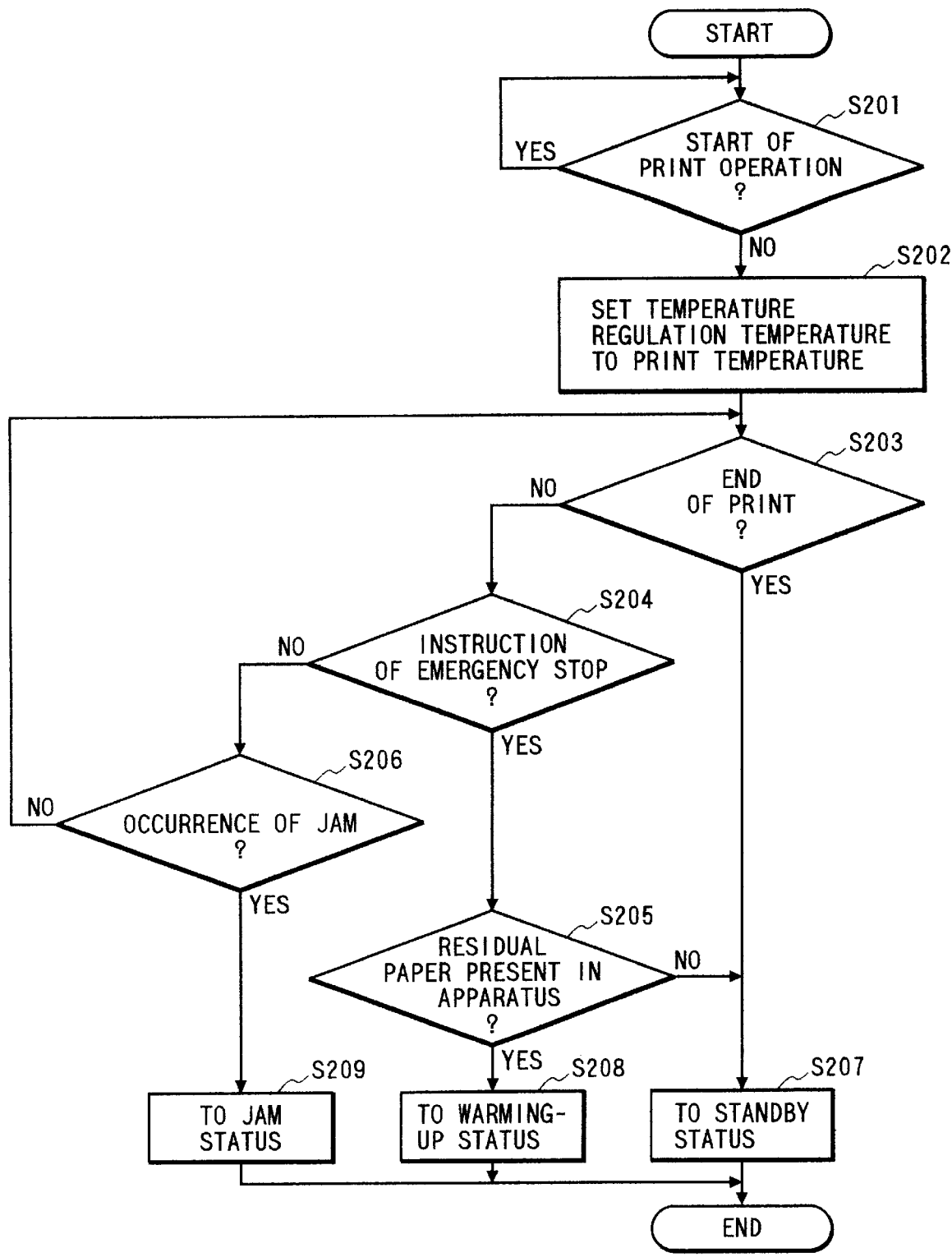
FIG. 6 is a flowchart showing a control of status managing means in the embodiment 3 of the invention.

FIG. 6 shows a flowchart for a control of the printing status of the status managing means 006 of the third embodiment. First in step S201, when the print operation is started, a regulation temperature is set to the print temperature in step S202. The end of the print operation is discriminated in step S203. When the print operation is finished, the processing routine advances to a standby status in step S207. For a period of time during which the print operation is continued in step S203, whether the emergency stop instruction has been received or not is judged in step S204 and whether the jam has occurred or not is judged in step S206. When the emergency stop instruction has been generated in step S204, the presence or absence of the in-apparatus residual paper is discriminated in step S205. When there is no in-apparatus residual paper, the processing routine advances to the standby status in step S207. When there is the in-apparatus residual paper, the processing routine advances to a warming-up status (process in FIG. 5) in S208. When the jam has occurred in step S206, the processing routine advances to the jam status in step S209. When no jam occurs, the processing routine is returned to step S203.

When there is the in-apparatus residual paper in step S205, the processing routine advances to the warming-up status in step S208 and it is a process similar to that in FIG. 5. When there is the in-apparatus residual paper, the paper becomes a target for the automatic paper discharge. That is, in the embodiment, when the emergency stop instruction is received during the print operation, if the paper remains in the apparatus, the occurrence of the jam is not immediately decided but the residual paper in the apparatus can be automatically discharged. When input/output apparatuses are connected as peripheral apparatuses, even in the case where an abnormality occurs in the peripheral apparatus and an emergency stop is instructed from the external apparatus, the process of the in-apparatus residual paper can be automatically performed by an instruction from the external apparatus without intervening by the user.

Although the case where the paper discharging apparatus 2 is connected as an optional apparatus has been described above, a paper feeding apparatus can be also connected. In such a case, for example, when a jam occurs in both of the paper feeding apparatus and the printing apparatus, the video controller 5 instructs the emergency stop to the engine controller 3, thereby making it possible to realize an interlocking relation between them.

According to the invention as described above, first, when a plurality of peripheral apparatuses are connected to the recording apparatus, the external apparatus (or operator) can manage the automatic paper discharging operation according to a situation of the whole apparatus constructing the system. The in-apparatus residual paper can be certainly ejected to the outside of the apparatus without damaging the apparatus in which a paper jam occurred among the apparatuses.

According to the invention, second, by providing the external interface processing means which ignores the paper discharging instruction from the outside until the printing apparatus enters a predetermined automatic paper discharge wait status, it is prevented that the recording apparatus itself performs an unreasonable paper transportation in a state in which the automatic paper discharge is impossible. Thus, the recording apparatus can naturally execute the automatic paper discharge.

Further, according to the invention, third, the external interface processing means for notifying the outside of a fact that the automatic paper discharge can be performed at a time point when the printing apparatus enters the predetermined automatic paper discharge wait status is provided for the recording apparatus. Thus, the external control apparatus (or operator) can generate the automatic paper discharging instruction when the recording apparatus enters the automatic paper discharge possible status, thereby enabling the management to the recording apparatus to be more easily executed from the external apparatus.

According to the invention, fourth, by providing a limit to the automatic paper discharge wait time of the recording apparatus and by regarding the occurrence of a jam when the paper discharging instruction is not generated within the predetermined time, safety of the recording apparatus is raised.

Similarly, according to the invention, fifth, with respect to the recording apparatus for thermally fixing, by providing a predetermined limit to the automatic paper discharge wait temperature of the fixing device as a condition for the automatic paper discharge wait status, the recording apparatus can also immediately cope with the automatic paper discharging command from the outside in a safe state.

According to the invention, sixth, even when the emergency stop instruction is received during the paper transportation, the occurrence of the jam is not decided but the residual paper can be automatically discharged, so that it is possible to eliminate an inconvenience such that the user removes the residual paper by himself from the apparatus with a complicated structure.

The present invention is not limited to the foregoing embodiments but many modifications and variations are possible within the spirit and scope of the appended claims of the invention.

What is claimed is:

1. A recording apparatus to which an option unit is connectible, said apparatus comprising:

means for checking the presence or absence of an in-apparatus residual paper when a jam is detected in the option unit; and control means for controlling said apparatus to shift into a paper dischargeable status when there is the presence of in-apparatus residual paper and to shift into a print wait status when there is the absence of in-apparatus residual paper irrespective of a fact that a jam is detected in the option unit.

2. An apparatus according to claim 1, further comprising control means for controlling said apparatus, wherein said control means comprises:

first instruction means for instructing a stop of paper feeding to said recording apparatus when a jam has occurred in the option unit; and second instruction means for instructing an ejection of in-apparatus residual paper in said recording apparatus after the stop of paper feeding is instructed by said first instruction means.

3. An apparatus according to claim 2, further comprising informing means for informing said control means that said recording apparatus is in said predetermined paper dischargeable status.

4. An apparatus according to claim 2, further comprising a fixing heater, wherein said apparatus stops driving of said fixing heater when said predetermined paper dischargeable status continues for a predetermined time without ejection of an in-apparatus residual paper.

5. A recording apparatus comprising:

checking means for checking the presence or absence of an in-apparatus residual paper at a predetermined timing;

reception means for receiving a paper discharge instruction from the outside of said apparatus:

control means for controlling said apparatus to shift into a paper dischargeable status in which the in-apparatus residual paper can be discharged when there is the presence of in-apparatus residual paper, even if said reception means has not yet received the paper discharge instruction; and paper discharge control means for controlling said apparatus not to discharge the in-apparatus residual paper even if said apparatus is in the paper dischargeable status if said reception means does not receive the paper discharge instruction.

6. An apparatus according to claim 5, further comprising notifying means for notifying the outside of information on the in-apparatus residual paper.

7. An apparatus according to claim 5, wherein said apparatus cancels the paper discharging instruction from the outside until said apparatus enters the paper dischargeable status.

8. An apparatus according to claim 5, further comprising means for notifying the outside of a fact that said apparatus has begun said predetermined dischargeable status.

9. An apparatus according to claim 5, wherein when said reception means does not receive a paper discharging instruction within a predetermined paper dischargeable time, said apparatus treats the in-apparatus residual paper as a jammed paper.

10. An apparatus according to claim 9, wherein said predetermined timing at which since the paper continuously remains on a transporting path, the paper is curled and cannot be transported.

11. An apparatus according to claim 5, wherein when said reception means receives a paper discharging instruction in said predetermined dischargeable status, said apparatus discharges the in-apparatus residual paper and is placed in a paper dischargeable status.

12. An apparatus according to claim 5, further comprising a thermal fixing device and said paper dischargeable status is a status in which said thermal fixing device is maintained at a predetermined temperature or higher.

13. An apparatus according to claim 12, wherein said apparatus ignores the paper discharging instruction until said apparatus enters said predetermined dischargeable status.

14. An apparatus according to claim 12, wherein said apparatus notifies the outside of a fact that an automatic paper discharge can be performed when a temperature of said fixing device reaches said predetermined temperature.

15. An apparatus according to claim 12, wherein when there is the presence of in-apparatus residual paper, said apparatus regulates a temperature of said fixing device at said predetermined temperature and waits and, when said reception means does not receive the paper discharging instruction within a predetermined time, said apparatus stops a driving (heating) of said fixing device.

16. An apparatus according to claim 15, wherein said predetermined time is a time at which a generation of fire or smoke does not occur when the paper remains in said fixing device at said predetermined temperature.

17. An apparatus according to claim 15, wherein said predetermined time is a time at which a burned trace is not formed on the paper when the paper remains in said fixing device at said predetermined temperature.

18. An apparatus according to claim 15, wherein said predetermined timing at which since the paper continuously remains on a transporting path, the paper is curled and cannot be transported.

19. An apparatus according to claim 12, wherein said predetermined temperature is a temperature at which a developing agent is not deposited to said fixing device.

20. An apparatus according to claim 12, wherein said predetermined temperature is a temperature at which a generation of fire or smoke does not occur when the paper remains in said fixing device.

21. An apparatus according to claim 12, wherein said predetermined temperature is a temperature at which a burned trace is not formed on the paper when the paper remains in said fixing device.

22. An apparatus according to claim 5, wherein said predetermined timing is a timing which responds to a turn-on or reset of a power source of said recording apparatus.

23. An apparatus according to claim 5, wherein said predetermined timing is a timing which responds to a recovery from at least a closure of a door, a jam, or a sleep mode.

24. An apparatus according to claim 5, wherein said predetermined timing is a timing which responds to the instruction from the outside.

25. An apparatus according to claim 5,
wherein an option unit is connectible to said apparatus,
wherein said predetermined timing is a timing when a jam is detected in said option unit.

26. An apparatus according to claim 25, further comprising control means for controlling said apparatus, wherein said control means comprises:

first instruction means for instructing a stop of paper feeding to said recording apparatus when a jam has occurred in said option unit; and second instruction means for instructing an ejection of residual paper in said recording apparatus after the stop of paper feeding is instructed by said first instruction means.

27. A control apparatus according to claim 25, wherein said option unit is one of a feeding unit and an ejecting unit.

28. A recording system comprising:
a recording apparatus comprising:
checking means for checking the presence or absence of an in-apparatus residual paper at a predetermined timing;

reception means for receiving a paper discharge instruction from the outside of said apparatus control means for controlling said recording apparatus to shift into a paper dischargeable status in which the in-apparatus residual paper can be discharged when there is the presence of an in-apparatus residual paper, even if said reception means has not yet received the paper discharge instruction; and paper discharge control means for controlling said recording apparatus not to discharge the in-apparatus residual paper even if said apparatus is in the paper dischargeable status if said reception means does not receive the paper discharge instruction;

an option unit; and a control apparatus for controlling said recording apparatus and said option unit to be connected to said recording apparatus, including:

first instruction means for instructing a stop of paper feeding to said recording apparatus when a jam has occurred in said option unit; and second instruction means for instructing an ejection of residual paper in said recording apparatus after the stop of paper feeding is instructed by said first instruction means.

29. A recording system according to claim 28, wherein said recording apparatus has informing means for informing said control apparatus that said recording apparatus is in the said predetermined dischargeable status.

30. A system according to claim 28, wherein said recording apparatus further comprises a fixing heater and stops driving of said fixing heater when said paper dischargeable status continues for a predetermined time without ejection of an in-apparatus residual paper.

* * * * *

UNITED STATES PATENT AND TRADEMARK OFFICE
CERTIFICATE OF CORRECTION

PATENT NO.    : 6,205,297 B1
DATED         : March 20, 2001
INVENTOR(S)   : Tatsuto Tachibana et al.

It is certified that error appears in the above-identified patent and that said Letters Patent is hereby corrected as shown below:

Column 2,
Lines 43, and 52, "a fire" should read -- a fire --.

Column 4,
Line 54, "004." should read -- S004. --; and
Line 54, "present" should read -- presence --; and
Line 59, "system" should read -- systems --.

Column 5,
Line 58, "controlling" should read -- controlling the system --.

Column 6,
Line 5, "a" should be deleted; and
Line 9, "a" should be deleted; and
Line 31, "a" should be deleted; and
Line 48, "a" should be deleted.

Column 7,
Line 5, "embodiment 1" should read -- first embodiment --.

Column 9,
Line 14, "embodi" should read -- third embodi --; and
Line 15, "ment third" should read -- ment --.

Column 13,
Line 2, "apparatus" should read -- apparatus; --.

Signed and Sealed this

Twenty-second Day of January, 2002

Attest:

JAMES E. ROGAN
Attesting Officer     Director of the United States Patent and Trademark Office